United States Patent
Deloison et al.

(10) Patent No.: US 9,329,044 B2
(45) Date of Patent: May 3, 2016

(54) GUIDANCE SYSTEM FOR AN INDIVIDUAL IN AN UNKNOWN ENVIRONMENT AND METHOD FOR IMPLEMENTING SUCH A SYSTEM

(71) Applicant: Cassidian SAS, Elancourt (FR)

(72) Inventors: Jean-Philippe Deloison, Serans (FR); Herve Mokrani, Sceaux (FR); Oliver Koczan, Puteaux (FR)

(73) Assignee: Cassidian SAS, Elancourt (FR)

(*) Notice: Subject to any disclaimer, the term of this patent is extended or adjusted under 35 U.S.C. 154(b) by 0 days.

(21) Appl. No.: 14/353,064

(22) PCT Filed: Oct. 18, 2012

(86) PCT No.: PCT/EP2012/004355
§ 371 (c)(1),
(2) Date: Apr. 21, 2014

(87) PCT Pub. No.: WO2013/056832
PCT Pub. Date: Apr. 25, 2013

(65) Prior Publication Data
US 2014/0244172 A1    Aug. 28, 2014

(30) Foreign Application Priority Data
Oct. 20, 2011   (FR) ...................................... 11 03219

(51) Int. Cl.
*G01C 21/00* (2006.01)
*G01C 21/20* (2006.01)
*H04Q 9/00* (2006.01)

(52) U.S. Cl.
CPC .............. *G01C 21/00* (2013.01); *G01C 21/206* (2013.01); *H04Q 9/00* (2013.01); *H04Q 2209/40* (2013.01); *H04Q 2209/823* (2013.01)

(58) Field of Classification Search
CPC ....................................................... G01C 21/00
USPC .......................................................... 701/537
See application file for complete search history.

(56) References Cited

U.S. PATENT DOCUMENTS

| | | | |
|---|---|---|---|
| 8,836,580 B2* | 9/2014 | Mendelson | 342/463 |
| 8,896,485 B2* | 11/2014 | Mendelson | 342/463 |
| 2011/0137549 A1* | 6/2011 | Gupta et al. | 701/201 |
| 2012/0084004 A1* | 4/2012 | Alexandre et al. | 701/527 |

FOREIGN PATENT DOCUMENTS

| | | |
|---|---|---|
| EP | 0 846 044 A2 | 6/1998 |
| FR | 2 918 746 A1 | 1/2009 |
| WO | WO 2010/108970 A1 | 9/2010 |

OTHER PUBLICATIONS

International Search Report for related International Application No. PCT/EP2012/004355; report dated Nov. 26, 2012.

* cited by examiner

*Primary Examiner* — Mary Cheung
*Assistant Examiner* — Anne Mazzara
(74) *Attorney, Agent, or Firm* — Miller, Matthias & Hull LLP

(57) ABSTRACT

A guidance system (SG) for an individual (IND) moving in an unknown environment establishes a guidance loop (B) between a measurement module (MM) placed on the individual and a remote guidance platform (PG). In the measurement module, a means (CP) collects measurement data (DM) that are transmitted by another means (UC1) of transmission to the guidance platform via a first communication channel. Then, at the guidance platform, a means (UT2) determines the tactical position data (DST) from the transmitted measurement data (DM), and another means (UC2) transmits determined guidance data (DG) from the tactical position data to a communication device of the individual by means of a second communication channel (R2), thus closing the guidance loop.

10 Claims, 3 Drawing Sheets

GUIDANCE SYSTEM FOR AN INDIVIDUAL IN AN UNKNOWN ENVIRONMENT AND METHOD FOR IMPLEMENTING SUCH A SYSTEM

CROSS-REFERENCE TO RELATED APPLICATIONS

This application is a 35 USC §371 U.S. national stage filing of International Patent Application No. PCT/EP2012/004355 filed on Oct. 18, 2012, which claims priority under the Paris Convention and 35 USC §119 to French Patent Application No. 11 03219, filed on Oct. 20, 2011.

FIELD OF THE DISCLOSURE

This invention relates to a guidance system for an individual in an unknown environment and the method for implementing such a system.

BACKGROUND OF THE DISCLOSURE

The invention has a particular application, particularly during interventions in critical situations and in unknown environments by safety workers such as fire fighters and emergency medical staff, police units or military forces.

In the state of the art, geolocation means identifying the location of a target, such as a targeted person or device, on a pre-established map by means of geographical coordinates. Such identification of location is achieved by means of firstly a GPS (Global Positioning System) receiver that locates the target considered exclusively outdoors and secondly a recorder and/or transmitter placed on the target. That recorder and/or transmitter can record and/or transmit respectively, in real time or with a time lag, the successive locations of the target as it moves, to the GPS receiver. Most often, the locations of the target are transmitted to the GPS receiver of a geolocation platform by means of a satellite communication system.

However, such a geolocation system, based on the use of a GPS receiver, cannot operate in a closed environment. That is because the signals sent by the transmitter located on the target cannot be detected by the GPS receiver. Further, the system uses a map, which is established previously, of the geographical environment in which the target is moving. Thus, it can be understood easily that the movement of a target in a closed environment, where the geographical configuration is unknown and of which there is no pre-established map, cannot be tracked by such a geolocation system.

A target can also be geolocated through a radio communication system, such as for instance a GSM (Global System for Mobile communications) system. Such GSM geolocation consists, firstly, in retrieving the identifiers of the GSM antennas to which the terminal is connected, and then, thanks to a database that connects the identifiers of cells to the geographical positions of antennas, the terminal is capable of determining its position and emitting an estimation of it.

However, the accuracy of GSM positioning can range from 200 meters to several kilometers, depending on whether the terminal is in an urban environment, with a high antenna density, or a rural environment.

Such inaccurate systems cannot be used to geolocate professionals, what is more public safety professionals, in closed environments.

All the same, the geolocation of public safety professionals during their work (for example fire brigades, police or emergency workers) is indispensable. That is because geolocation is carried out to enable the control room operators to know where the different safety workers are located, and thus ensure that their work can be done safely. Where applicable, control room operators can then take appropriate action and if required, transmit it directly to the workers in the field.

However, while working indoors, such as in a shopping centre, a factory, a car park or any other building, public safety professionals cannot use the aforementioned conventional geolocation system, because they need to work in a closed environment, which is, more importantly, an unknown environment. In the absence of relevant information about the topography of the place and the environmental conditions in which the worker is moving, it is impossible for the control platform operators to guide them optimally.

The safety of workers in critical situations depends on the quality of the assistance that the remote operator can give them. As a result, operations control operators need to have a complete image, in real time, of the critical situation in which the monitored worker is working, so that the said operator can react effectively and take the steps required to guide the worker as their work progresses.

SUMMARY OF THE DISCLOSURE

The invention is aimed at remedying the drawbacks described above by putting in place a guidance system for an individual in an unknown environment, the said individual being capable of being part of a guidance loop without resorting to the detection of signals transmitted by a GPS receiver.

To that end, a guidance method for guiding an individual moving in an unknown environment from a remote guidance platform is characterised in that it comprises a guidance loop comprising the following steps:
- collection of measurement data taken by a measurement module placed on the individual,
- transmission of the measurement data collected, from the measurement module to the guidance platform by means of a first communication channel of a first radiocommunications network,
- determination of tactical position data from the transmitted measurement data, at the guidance platform,
- determination of guidance data from the determined tactical position data, at the guidance platform, and
- transmission of the determined guidance data, to a communication device of the individual by means of a second communication channel of a second radiocommunications network.

Thanks to the method in the invention and the guidance loop, when an individual with a measurement module moves in an unknown and potentially hazardous environment, an operator interacting on the guidance platform is made aware in real time of the tactical position data relating to the movements of the individual and their environment. The operator thus determines the guidance data to transmit to the individual to help him in their movements.

The method for guiding an individual according to the invention may also have one or more of the characteristics below, considered individually or in all the combinations that are technically possible.

In a non-limitative embodiment, guidance data are transmitted from a communication device of an operator of the guidance platform to the communication device of the individual by means of a second radiocommunications network.

In a non-limitative embodiment, the first radiocommunications network and the second radiocommunications network are a single radiocommunications network.

In a non-limitative embodiment, the first communication channel and the second communication channel are a single communication channel.

In a non-limitative embodiment, the measurement data are at least topographical data and data about the movement of the individual and the step of determining the tactical position data comprises the building of a map of an unknown environment close to the individual and positioning the individual on the map from the topographical data and the movement data.

In a non-limitative embodiment, the unknown environment is mapped in the guidance platform from a data merger algorithm applied to the topographical data and the movement data.

In a non-limitative embodiment, the measurement module collects biometric data about the individual, pre-processes the biometric data by comparison with a critical biometric threshold and sends to the guidance platform a biometric alert status when the value of a collected biometric data exceeds the critical biometric threshold.

In a non-limitative embodiment, the measurement module collects environmental data, pre-processes the environmental data by comparison with a critical environmental threshold and sends to the guidance platform an environmental alert status when the value of a collected environmental data exceeds the critical environmental threshold.

The invention also relates to a guidance system for an individual moving in an unknown environment. The system comprises a measurement module placed on the individual and a remote guidance platform and is characterised in that it also includes:
- a means, in the measurement module, for collecting measurement data,
- a means, in the measurement module, for transmitting the collected measurement data to the guidance platform via a first communication channel of a first radiocommunications network,
- a means, in the guidance platform, to determine the tactical position data from the transmitted measurement data,
- a means, in the guidance platform, to transmit guidance data determined from tactical position data to a communication device of the individual by means of a second communication channel of a second radiocommunications network.

the system implements the steps of the guidance method.

The invention also relates to a computer program capable of being implemented in a guidance system for an individual moving in an unknown environment. The program is characterised in that it includes instructions which carry out the steps of the method in the invention when the program is executed in the guidance system.

BRIEF DESCRIPTION OF THE DRAWINGS

Other characteristics and advantages of this invention will become clearer in the description below of several embodiments of the invention given as non-limitative examples, by reference to the corresponding drawings enclosed, where.

DETAILED DESCRIPTION OF THE DISCLOSURE

It must be noted that the figures are not to scale.

The following embodiments are examples. Even though the description refers to one or more embodiments, that does not necessarily mean that each reference relates to the same embodiment or that the characteristics apply to only one embodiment. Simple characteristics of the different embodiments can also be combined to supply other embodiments.

Figure 1:
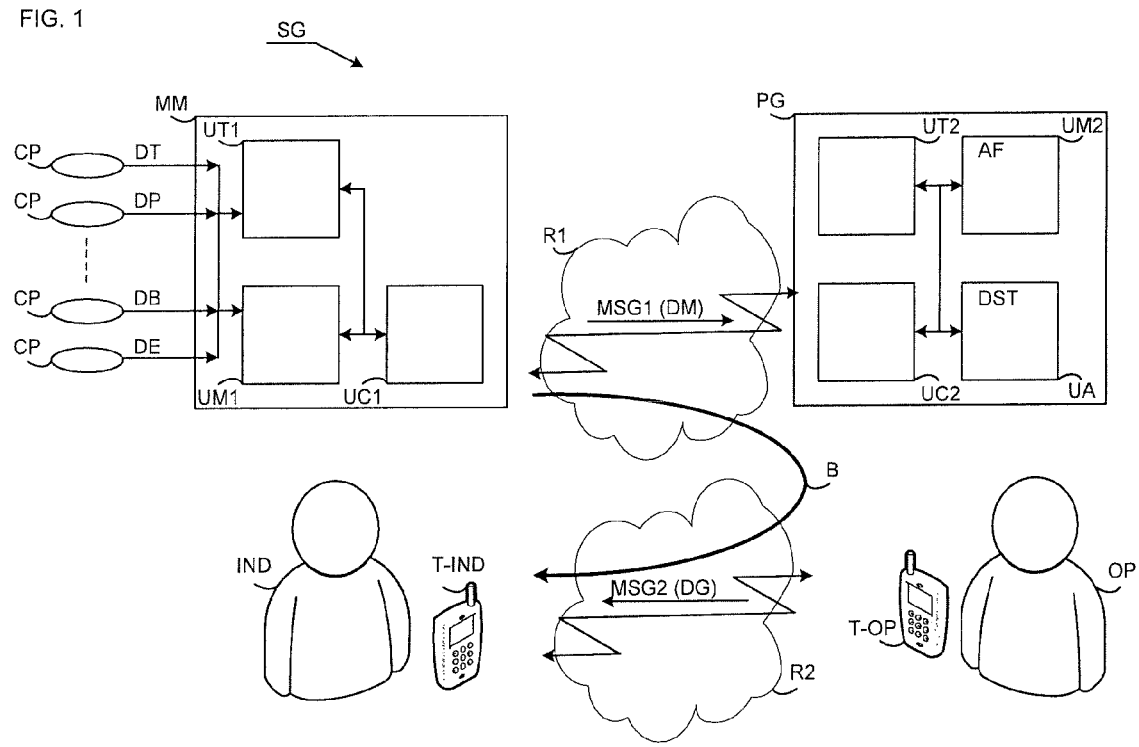
FIG. 1 is a schematic block diagram of a first embodiment of a guidance system implementing a method according to the invention.
Figure 2:
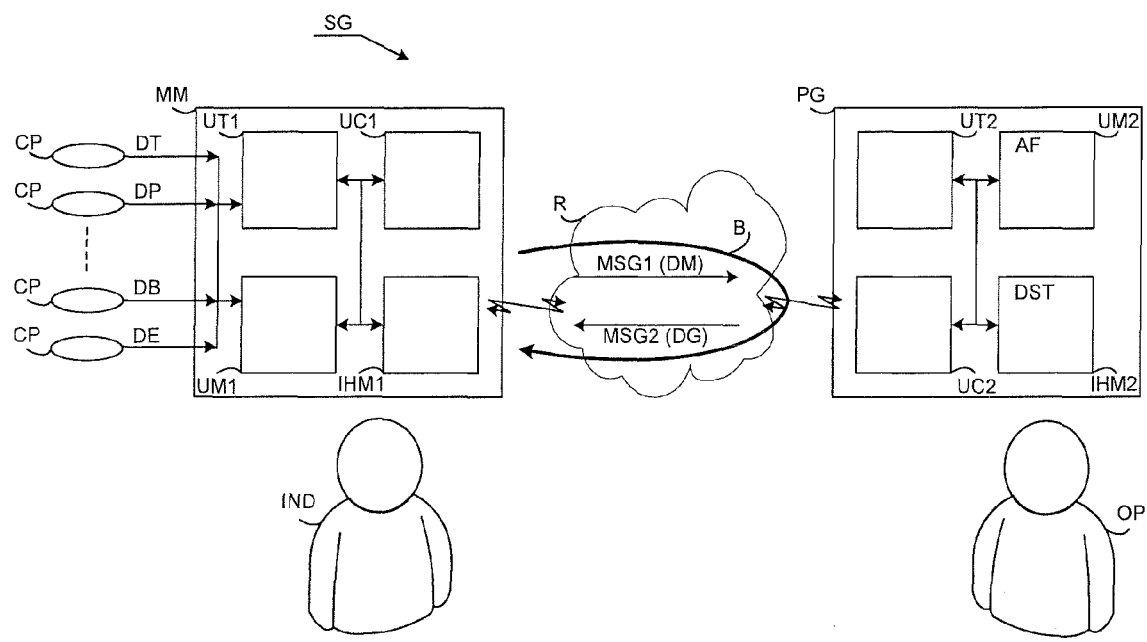
FIG. 2 is a schematic block diagram of a second embodiment of a guidance system implementing the method according to the invention.

By reference to FIGS. 1 and 2, a guidance system SG of an individual IND moving in an unknown environment is illustrated in two different embodiments respectively. An unknown environment is an environment where the topography of the place is not established or can change during the work.

In a preferred embodiment, by reference to FIG. 1, an individual IND, also called the user, is a person with permission to undertake critical missions, such as a law enforcement agent, a fire fighter or others. That individual IND is equipped with a measurement module MM, according to the invention. When the individual IND moves, the measurement module MM is capable of periodically collecting measurement data DM by means of sensors CP. These measurement data DM particularly include topographical data DT of the place of work, and movement data DP of the individual IND in that place. The measurement data MD are transmitted in real time via a first secure network R1, from the measurement module MM, to a remote guidance platform PG. Such a network R1 will be defined in what follows.

The guidance platform PG, also called control room, is located outside the place of work, such as for example in a vehicle located close to the place of work or in a fixed remote control centre.

Depending on the measurement data DM received, the guidance platform PG determines the tactical position data DST. These tactical position data DST may for instance allow the real-time mapping of the place of work and the positioning of the individual IND on the said map established.

Depending on the tactical position data DST displayed on a display unit UA of the guidance platform PG, an operator OP of the guidance platform PG determines the guidance data DG of the individual IND to guide him in the unknown environment in which they are moving.

The operator OP transmits the guidance data DG to the individual IND by means of a second secure radiocommunications network R2. That second network R2 can be established between a communication terminal T-OP of the operator OP and a communication terminal T-IND of the individual IND. Such a network R2 will be defined in what follows.

The collection of measurement data DM from the measurement module MM placed on the individual IND is transmitted to the guidance platform PG. When the platform PG has received the measurement data DM, it determines the tactical position data DST and the guidance data DG. When the platform PG has determined the data DST and DG, it then transmits the said guidance data DG to the individual IND, thus forming a guidance loop B.

That guidance loop B offers the benefit to the individual IND who is in a state of stress and is working in an unknown environment of avoiding any accidental manipulation of their equipment and enabling him to concentrate exclusively on the instructions transmitted to him, obtained from the guidance data.

The guidance loop B also allows the operator OP interacting from the guiding platform PG, to view, in real time, the movements of the individual IND on a map representative of the environment in which they are moving. The map is established gradually as the individual IND moves, as the said topography of the place could change at any time.

For example, during building fires following an attack, such as those that occurred unfortunately on 11 Sep. 2001, fire fighters who are aware of the complete map of the building before the attacks are still unable to move easily due to the collapse of several walls and ceilings and due to the smoke and dust that make the environment of work unknown, with low visibility. If fire fighters are able to use the measurement module MM according to the invention, that can for example allow them to detect the collapse of a wall that has first been mapped by the guidance platform PG as they progress. Thus a change in the topography of the place of work is taken into account by the guidance platform PG, which updates the map, or in other words the tactical position data DST.

The measurement data DM and the guidance data DG are, in a non-exhaustive manner, narrowband data to allow the fluid transmission of data in the radiocommunications networks.

For example, the measurement data DM and/or the guidance data DG may be integrated in SMS (Short Message Service) type text messages. In another example, the guidance data DG may be voice data or predefined messages that correspond with a pre-established piece of information or a combination of several such communications.

By reference to FIG. 1, the entities of the guidance system SG are described in greater detail in a first embodiment of the invention.

The measurement module MM placed on the individual comprises:
sensors CP to collect the measurement data DM,
a processing unit UT1, particularly to pre-process the collected measurement data,
a memory unit UM1 to save the measurement data collected and/or pre-processed, and
a communication unit UC to transmit measurement data to the guidance platform PG.

The different elements UT1, UM1 and UC1 of the measurement module MM can be connected to each other by a bidirectional bus.

The sensors CP, the processing unit UT1, the memory unit UM1 and the communication unit UC1 are functional blocks, most of which carry out functions relating to the invention and may correspond with software modules implemented in at least one processor and/or dedicated and/or programmable hardware modules.

The measurement module MM is fitted on the uniform of the individual so as to optimally collect the measurement data required for guidance, without hampering the movements of the individual. Uniform means clothing, for example, that is suited to hazardous interventions, such as fire-proof suit or bullet-proof vest or others.

In a first alternative, the processing unit UT1, the memory unit UM1 and the communication unit UC1 of the measurement module may be mounted on a printed circuit board placed in a uniform pocket designed to hold the card. The sensors CP connected to the board with or without wires may be fixed at strategic locations on the uniform to optimally collect measurement data DM.

In a second alternative, the measurement module MM is a unit fastened to the belt of the individual IND, the sensors CP being placed in or on the unit, other sensors being connected with or without wires to the unit and fixed to the uniform of the individual IND.

The measurement module MM comprises several sensors CP to periodically collect the measurement data DM. The measurement module MM comprises at least one sensor to collect topographical data DT from the place of intervention and a sensor to collect the movement data DP of the individual.

The topographical data DT are collected by an obstacle detection sensor using ultrasound or laser technology or a stereoscopic camera. The said detection sensor measures and detects the presence of walls, wall edges, windows and other potential obstacles. These topographic measurements help the subsequent determination at the guidance platform PG of the map of the place in which the individual IND is moving.

The movement data DP of the individual IND are collected by a movement sensor that picks up the movement of the individual, such as at least an inertial sensor that can measure in real time the displacement movements of the individual and/or the acceleration of the individual and/or other data that make it possible to subsequently determine the position of the individual in the premises from the guidance platform. At least one inertial sensor may be placed on a shoe of the individual or on their shoulder.

Other measurement data may be collected by sensors of the measurement module MM. Biometric data DB may be collected in order to determine the physiological conditions of the individual, such as their temperature, blood pressure or heart rate. Biometric data are collected by body sensors such as temperature sensors, blood pressure sensors and/or heart sensors.

Environmental data DE such as the temperature of the room in which the individual IND is located or the presence of fumes or gas can be collected in order to determine the environmental conditions in which the individual IND is moving. The environmental data DE are collected by temperature sensors, smoke or gas detectors etc. An environmental sensor may, for example, be an NRBC (Nuclear, Radiological, Biological, Chemical) sensor or generally a sensor that can measure the presence of some gas and possibly the proportion of the gas in question present in the atmosphere, the presence of radiation and possibly its quantity or the presence of toxic or hazardous products.

The processing unit UT1 may periodically command the collection of measurement data from the sensors or some of the sensors. In one alternative, the sensors collect measurement data periodically and automatically.

After the measurement data are collected by the sensors CP, the measurement data are temporarily saved in the memory unit UM1. Such a memory unit UM1 is known to the person of the art and is not covered by this invention. A more detailed description of that memory unit is thus not necessary.

The measurement data DM are saved in the memory unit UM1 according to their characteristics, such as topographical data, movement data, biometric data and environmental data. The distinction between the different characteristics of data may also be more detailed.

For example, a piece of topographical data collected may be the edge of a wall, or a distance between an individual and a wall, or another obstacle.

For example, a piece of biometric data may be the heart rate of the individual or their body temperature or another body parameter.

For example, a piece of environmental data may be the temperature of the place, the detection of gas or the detection of smoke. The accuracy relating to the measurement data DM collected may be defined by the memory location selected for that data characteristic in the memories of the memory unit UM1.

In one alternative, the accuracy relating to the measurement data DM collected may be defined by saving the measurement data DM in association with an identifier specifying the characteristic of the data.

The saving of the measurement data DM may be commanded by the processing unit UT1. The processing unit UT1 comprises one or more microprocessors that use one or more low-processing execution programs, saved in at least one of the memories of the memory unit UM1. A low-processing execution program is a rapid-execution program that uses low computation resources and low memory resources.

The processing unit UT1 executes simple pre-processing on certain measurement data DM such as biometric data and environmental data. Pre-processing is carried out by low-processing execution programs saved in the memory unit. Pre-processing consists, among other things, in comparing the value of a measurement data with a critical threshold.

A biometric data such as the individual's blood pressure is compared with a critical biometric threshold, related in the example to a critical blood pressure threshold. If the measurement data exceeds the critical biometric threshold, the processing unit generates a biometric alert status relating to the blood pressure of the individual IND.

Similarly, an environmental data such as the temperature of the place of work is compared with a critical environmental threshold, related in the example to a critical temperature threshold. If the measurement data exceeds the critical environmental threshold, the processing unit generates an environmental alert status relating to the temperature of the place.

A biometric or environmental alert status may be a binary data with the value 'one', where 'zero' is the normal status.

The pre-processing by the processing unit offers the advantage of only transmitting the results required, such as the biometric or environmental alert statuses, to the guidance platform PG; the biometric and/or environmental data applied to pre-processing are not always transmitted to the guidance platform, reducing the number of measurement data to transmit.

As an alternative, pre-processing may be executed by a processing unit of the guidance platform PG, which in that case always receives all the measurement data required for the said pre-processing. The topographical data DT and the movement data DT are always transmitted to the guidance platform PG.

To transmit measurement data DM to the guidance platform PG, the processing unit UT1 of the measurement module MM also establishes a first message MSG1 comprising measurement data DM. The first message MSG1 particularly comprises the latest topographical data DT and the latest movement data DP collected.

The first message MSG1 may also comprise the latest biometric data DB and the latest environmental data DE. The first message MSG1 may also comprise the biometric alert statuses and/or the environmental alert statuses generated by the processing unit UT1. The first message MSG1 may be made up of different fields, some of which are allocated to a characteristic of the measurement data to transmit, so that the processing unit of the platform can, upon receipt of the message, identify the measurement data received and process them.

In one alternative, each piece of measurement data to transmit is transmitted in association with an identifier characterising the data. The first message MSG1 is preferably a narrowband message such as a short text message of the SMS (Short Message Service) type.

The first message established by the processing unit UT1 is sent to the guidance platform PG from the communication unit UC1 of the measurement module MM. The communication unit UC1 is known to the person of the art and is not part of this invention. A more detailed description of that communication unit is thus not necessary.

The communication unit UC1 is capable of transmitting and receiving messages, preferably narrowband messages, by means of a first communication channel established in a first secure radiocommunications network R1.

The first network R1 is preferably a PMR (Private Mobile Radio) communication network generally used by professional users. A PMR network is a network that may be a narrowband network, such as a DMR (Digital Mobile Radio), TETRA (TErrestrial Trunked RAdio) or P25 (Project 25) network. A PMR network may also be a broadband network such as an LTE (Long-Term Evolution) or WIMAX (Worldwide Interoperability for Microwave Access) network. These different types of PMR network each have digital cellular radio interfaces, particularly based on the IP (Internet Protocol) protocol.

The invention may also apply to other types of radiocommunications networks, such as for example GSM (Global System for Mobile Communications) networks or UMTS (Universal Mobile Telecommunications System) networks. In all cases, the first network R1 is capable of transmitting secure reliable communication between two entities, such as the measurement module MM and the guidance platform PG.

The guidance platform PG comprises:
- a communication unit UC2 to receive measurement data from the measurement module MM,
- a processing unit UT2, particularly for processing the received measurement data and determining the tactical position data DST,
- a saving unit UM2, particularly for saving the received measurement data and the determined tactical position data DST, and
- a display unit UA, to display the determined tactical position data DST, so that they can be viewed by the operator or operators OP interacting on the guidance platform PG.

The different elements UT2, UM2, UC2 and UA of the guidance platform PG may be connected to each other by a bidirectional bus. The processing unit UT2, the memory unit UM2, the communication unit UC2 and the display unit UA are functional blocks. Most of these different functional blocks carry out functions relating to the invention, and may be software modules implemented in at least one processor and/or dedicated and/or programmable hardware modules.

The communication unit UC2 receives the first message MSG1 transmitted by the communication unit UC1 of the measurement module MM. The communication unit UC2 is known to the person of the art and is not part of this invention. A more detailed description of that communication unit is thus not necessary.

The communication unit UC2 is capable of transmitting and receiving messages, preferably narrowband messages, by means of the first communication channel established in a first network R1.

Upon receipt of the first message MSG1, the processing unit UT2 identifies the different measurement data contained in the message in order to process them. The processing unit UT2 comprises one or more microprocessors that use one or more execution programs saved in at least one of the memories of the memory unit UM2. The said programs executed by the processing unit UT2 are complex processing programs that require powerful and fast computing resources.

As soon as the measurement data are identified, the processing unit UT2 determines the tactical position data DST. The tactical position data DST are determined more particularly depending on the topographical data DT received and the movement data DP received. The tactical position data DST may be determined by applying a data merger algorithm AF to the topographical data and the movement data. The algorithm makes it possible, firstly, to map the place of work as the individual moves, on the basis among others of the topographical data, and secondly, to determine the position of the individual on the map established, on the basis of the movement data. The data merger algorithm AF is saved in the memory unit UM2.

Such a memory unit UM2 is known to the person of the art and is not covered by this invention. A more detailed description of that memory unit is thus not necessary. The memory unit UM2 of the guidance platform PG comprises a larger memory space than the memory unit UM1 of the measurement module MM. That is because the processing applied to measurement data is more complex and requires more rapid-access memory resources.

As soon as the tactical position data DST are determined, the processing unit UT2 commands the display of the said data on a display screen of the display unit UA. Other data may be displayed by the display unit UA, such as biometric and/or environmental alert statuses, or the latest biometric and/or environmental data required for monitoring the individual. The display unit may be connected to a keyboard or other device that allows the operator to enter the display commands, for example.

The operator OP views the data displayed on the display unit and determines the guidance data DG, also called guidance instructions, from those data. The guidance instructions comprise, among others, movement instructions such as "Turn right", "Turn left" "Turn back" etc.

The operator OP transmits the guidance instructions to the individual IND by means of a communication device, also called user terminal T-OP. A terminal T-OP is a workstation such as a laptop computer, an electronic book, a smartphone, a personal computer, a microcomputer, a digital personal assistant or a device on board a vehicle. The terminal T-OP is capable of transmitting a second message MSG2 comprising guidance data DG, by means of a second communications channel of a second secure radiocommunications network R2.

The second network R2 is preferably a PMR (Private Mobile Radio) communication network generally used by professional users. A PMR network is a network that may be a narrowband network, such as a DMR (Digital Mobile Radio), TETRA (TErrestrial Trunked RAdio) or P25 (Project 25) network. A PMR network may also be a broadband network such as an LTE (Long-Term Evolution) or WIMAX (Worldwide Interoperability for Microwave Access) network. In all cases, the second network R2 is capable of transmitting reliable secure communication between two user terminals T-OP and T-IND.

The individual IND receives the guidance data from the operator by means of a communication device, also called a user terminal T-IND. A user terminal T-IND is a small workstation such as a pocket computer or a smartphone. The terminal T-IND is preferably fixed to the uniform of the individual, so that their hands are free. The terminal T-IND is capable of receiving a second message MSG2 comprising guidance data DG, by means of a second communications channel of the network R2. The second message MSG2 is preferably a narrowband message, such as an audio message. In one alternative, the second communication channel can only transmit short text messages containing guidance data. These guidance data are designed to be displayed on a screen of the terminal of the individual IND. The individual IND can also exchange information directly with the operator OP in a third type of message (not illustrated) generated in audio or SMS text form. These messages are transmitted to the terminal T-OP of the operator OP, by means of a second communication channel.

In one alternative of this first embodiment, the first and second radiocommunications networks, R1 and R2 respectively, may form one and the same secure network capable of supporting the first communication channel established between the measurement module MM and the guidance platform PG and the second communication channel established between the two terminals T-OP and T-IND.

A second embodiment of the invention is illustrated in FIG. 2. Only one communication channel is established between the measurement module MM and the guidance platform PG. That communication channel is supported by a secure communication network R similar to networks R1 and R2. The communication channel is capable of carrying the first messages MSG1 containing at least the measurement data DM and the second messages MSG2 containing the guidance data DG.

In this embodiment, the measurement module MM comprises sensors CP, a processing unit UT1, a memory unit UM1, a communication unit UC1 and a communication device of the individual IND, such as a user interface IHM1. The units UT1, UM1, UC1 and IHM1 are connected by a bidirectional bus.

The processing unit UT1, the memory unit UM1 and the communication unit UC1 are similar to the corresponding units of the first embodiment illustrated in FIG. 1. The user interface IHM1 particularly comprises a microphone and a speaker that replace the functions of the terminal T-IND of the first embodiment. The user interface IHM1 can on a secondary basis comprise a display screen and a keypad, of the touch type or another type. The user interface may be placed on the uniform of the individual so that it does not hamper their movements and can be easily accessible by the individual IND. For example, the user interface may be positioned or integrated into the sleeve of the uniform. Upon receipt of a second message MSG2, the processing unit UT1 identifies the guidance data DG and transfers them to the user interface IHM1. The interface IHM1 displays the guidance data by means of a screen or announces the guidance data by means of a speaker.

The microphone of the user interface IHM1 can pick up information from the individual IND intended to be transmitted to the operator OP. The information is processed by the processing unit UT1 and is included with the measurement data in one of the first messages MSG1. The message MSG1 is transmitted to the guidance platform PG from the communication unit UC1 of the measurement module MM.

In this second embodiment, the guidance platform PG includes a communication unit UC2, a processing unit UT2, a memory unit UM2 and an operator communication device, such as a user interface IHM2. The units UT2, UM2, UC2 and IHM2 are connected by a bidirectional bus. The processing unit UT2, the memory unit UM2 and the communication unit UC2 are similar to the corresponding units of the first embodiment illustrated in FIG. 1.

The user interface IHM2 particularly includes a microphone, a speaker and a display screen that replace the functions of the terminal T-OP and the display unit UA of the first embodiment respectively. The user interface IHM2 can on a secondary basis comprise a keypad, of the touch type or another type. The user interface may be integrated into the guidance platform or may be an entity such as a computer, connected with or without wires to the guidance platform PG. Upon receipt of the first message MSG1, the processing unit UT2 identifies the measurement data and the information of the individual IND. The measurement data are processed in a manner similar to the first embodiment.

The information about the individual is transmitted to the user interface IHM2, to be either displayed on the display screen or announced on the speaker. The operator OP becomes aware of the data and information, which are accessible by means of the interface IHM2 and transmits guidance instructions DG to the individual by means of the interface IHM2. The processing unit UT2 establishes a second message MSG2 comprising the guidance data entered or announced by the operator OP by means of the interface IHM2. The communication unit UC2 transmits the message MSG2 to the communication unit UC1 of the measurement module MM by means of a communication channel supported by the network R.

Figure 3:
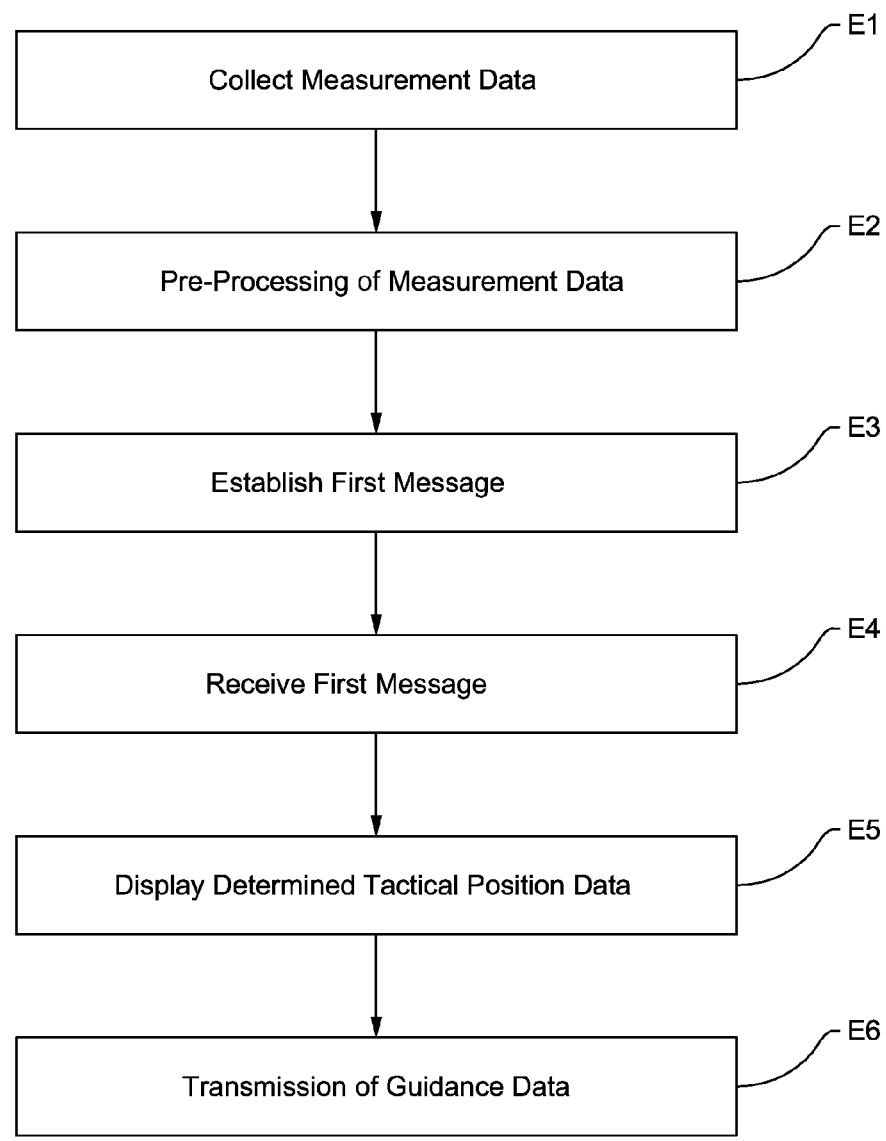
FIG. 3 is an algorithm of the guidance method according to the invention.

By reference to FIG. 3, the main steps of the guidance method for an individual moving in an unknown environment by forming a guidance loop B are illustrated. The method comprises the main steps E1 to E6.

During one step E1, the sensors CP of the measurement module MM collect the measurement data DM.

During one step E2, the processing unit UT1 of the measurement module MM carries out one or more processing operations PT1, called pre-processing, on certain measurement data such as biometric and environmental data. Biometric alert statuses and/or environmental alert statuses may result from pre-processing.

During one step E3, the processing unit UT1 establishes a first message MSG1 comprising at least measurement data including the latest collected topographical data and the latest collected movement data. The message MSG1 may also comprise the latest collected biometric and/or environmental data. The message MSG1 may also comprise the alert statuses resulting from early processing. In a second embodiment, the message MSG1 may also include audio information or other information from the individual IND to transmit to the operator OP. The communication unit UC1 of the measurement module MM transmits, either by means of the first communication channel in the first embodiment illustrated in FIG. 1 or by means of the only communication channel in the second embodiment illustrated in FIG. 2, the first message MSG1 to the guidance platform PG.

During a step E4, the communication unit UC2 of the guidance platform receives the first message MSG1. The processing unit UT2 of the guidance platform PG analyses the message MSG1 and processes at least the topographical data and the movement data, in order to determine the tactical position data DST. The tactical position data DST may be determined by means of a data merger algorithm AF applied to the topographical data and the movement data. The unit UT2 calls and executes the algorithm AF, saved in the memory unit UM2, in order to apply it to the topographical data and the movement data.

During a step E5, the processing unit UT2 commands the display of determined tactical position data DST on the display unit UA of the guidance platform. The operator of the guidance platform PG determines the guidance data DG depending, among others, on the tactical position data DST and also the measurement data DM or alert statuses, which may be displayed by the display unit UA.

A step E6 comprises the transmission of guidance data DG to the individual IND. In the first embodiment of the invention, illustrated in FIG. 1, the guidance data DG are transmitted from the terminal T-OP of the operator OP to the terminal T-IND of the individual IND by means of a second communication channel, the terminal of the individual then announcing the guidance data DG to the individual IND. In the second embodiment of the invention illustrated in FIG. 2, the guidance data DG are transmitted by the communication unit UC2 of the guidance platform PG to the communication unit UC1 of the measurement module MM, by means of the single communication channel. In this second embodiment, the guidance data DG are transmitted to the individual IND by mean of the user interface IHM1 of the measurement module MM.

The step E6 may be looped back to step E1, thus reiterating the guidance loop, by starting a new collection of data in the measurement module MM.

In one alternative, the steps E1, E2 and E3 may be reiterated with each movement by the individual IND involving a change in at least one piece of measurement data collected. Thus, the guidance platform PG can obtain in real time, for example, modified measurement data DM with each movement by the individual.

In one implementation, the different operations included in the steps described above are carried out through instructions from one or more computer programs incorporated into one of the devices according to the invention. They are therefore located particularly in the measurement module MM and a guidance platform PG. As a result, the invention also applies to a computer program, particularly a computer program saved on or in a saving medium that can be read by a computer or any data processing device adapted to implement the invention. That program may use any programming language and may be in the form of source code, object code or intermediate code between source and object code, in a partly compiled form or in any other form desirable for implementing the method according to the invention. The program may be downloaded in the device via a communication network.

The saving medium may be any entity or device capable of storing the program. For example, the medium may comprise a saving means on which the computer program according to the invention is saved, such as a ROM, for example a CD-ROM or a microelectronic circuit ROM or a USB stick or a magnetic saving means, such as a hard drive.

The invention claimed is:

1. A guidance method for an individual (IND) moving in an unknown environment from a remote guidance platform (PG), characterised in that it comprises a guidance loop (B) comprising the following steps:
    collection (EI) of measurement data (DM) taken by a measurement module (MM) placed on the individual, pre-processing biometric data and environmental data of the collection of measurement data to reduce the biometric data and the environmental data to a single binary biometric alert value and a single binary environmental alert value for transmission to the guidance platform (PG);
    transmission (E3) of the measurement data collected, from the measurement module to the guidance platform (PG) by means of a first communication channel of a first radiocommunications network (R1),
    determination (E4) of tactical position data (DST) from the transmitted measurement data (DM), at the guidance platform,
    determination (E5) of guidance data (DG) from the determined tactical position data (DST), at the guidance platform, and
    transmission (E6) of the determined guidance data (DG), to a communication device of the individual by means of a second communication channel of a second radiocommunications network (R2).

2. A guidance method according to claim 1, wherein the guidance data (DG) are transmitted from a communication device (T-OP, IHM2) of an operator (OP) of the guidance platform (PG) to the communication device (T-IND, IHM1) of the individual by means of a second radiocommunications network (R2).

3. A guidance method according to claim 1, wherein the first radiocommunications network (R1) and the second radiocommunications network (R2) are a single radiocommunications network.

4. A guidance method according to the claim 1, wherein the first communication channel and the second communication channel are a single communication channel.

5. A guidance method according to claim 1, wherein the measurement data (DM) are at least topographical data (DT) and data about the movement (DP) of the individual and the step of determining (E4) the tactical position data (DST) comprises building a map of an unknown environment close to the individual and positioning the individual on the map from the topographical data and the movement data.

6. A guidance method according to claim 5, wherein the unknown environment is mapped at the guidance platform (PG) with the help of a data merger algorithm (AF) applied to the topographical data (DT) and the movement data (DP).

7. A guidance method according to claim 1, wherein the measurement module collects biometric data (DB) about the individual, pre-processes (E2) the biometric data by comparison with a critical biometric threshold and sends to the guidance platform (PG) the single binary biometric alert value when the value of a collected biometric data exceeds the critical biometric threshold.

8. A guidance method according to claim 1, wherein the measurement module (MM) collects environmental data, pre-processes (E2) the environmental data by comparison with a critical environmental threshold and sends to the guidance platform the single binary environmental alert value when the value of a collected environmental data exceeds the critical environmental threshold.

9. A guidance method according to claim 1, further comprising a non-transitory storage medium capable of being implemented in a guidance system (SG) for an individual (1ND) moving in an unknown environment, the non-transitory storage medium having instructions which, when the non-transitory storage medium is executed in the guidance system, carry out the steps of the guidance method.

10. A guidance system (SG) for an individual (IND) moving in an unknown environment comprising a measurement module (MM) placed on the individual and a remote guidance platform (PG) characterised in that it comprises:
 a plurality of sensors (CP), in the measurement module, for collecting measurement data (DM);
 a first processing unit (UT1), in the measurement module, for pre-processing biometric data and environmental data of the measurement data (DM) to reduce the biometric data and the environmental data to a single binary biometric alert value and a single binary environmental alert value for transmission;
 a first communication unit (UC1), in the measurement module, for transmitting the collected measurement data to the guidance platform via a first communication channel of a first radiocommunications network (R1);
 a second processing unit (UT2), in the guidance platform, to determine the tactical position data (DST) from the transmitted measurement data (DM);
 a second communication unit (UC2), in the guidance platform, for transmitting guidance data (DG) determined from tactical position data to a communication device of the individual by means of a second communication channel of a second radiocommunications network (R2); and the system implementing a guidance method for the individual (IND) moving in the unknown environment from the remote guidance platform (PG), characterised in that it comprises a guidance loop (B) comprising the following steps:
 collection (EI) of the measurement data (DM) taken by the measurement module (MM) placed on the individual, pre-processing the biometric data and the environmental data of the collection of measurement data to reduce the biometric data and the environmental data to the single binary biometric alert value and the single binary environmental alert value for transmission to the guidance platform (PG);
 transmission (E3) of the measurement data collected, from the measurement module to the guidance platform (PG) by means of the first communication channel of the first radiocommunications network (R1),
 determination (E4) of the tactical position data (DST) from the transmitted measurement data (DM), at the guidance platform,
 determination (E5) of the guidance data (DG) from the determined tactical position data (DST), at the guidance platform, and
 transmission (E6) of the determined guidance data (DG), to the communication device of the individual by means of the second communication channel of a second radiocommunications network (R2).

* * * * *